United States Patent [19]

Gagnon, Sr.

[11] Patent Number: 4,893,428

[45] Date of Patent: Jan. 16, 1990

[54] SELF-ALIGNING DECOY

[76] Inventor: Kenneth M. Gagnon, Sr., 4 Mill St., Cumberland, R.I. 02864

[21] Appl. No.: 338,191

[22] Filed: Apr. 14, 1989

[51] Int. Cl.4 ............................................. A01M 31/06
[52] U.S. Cl. ........................................................... 43/3
[58] Field of Search ............................................... 43/3

[56] References Cited

U.S. PATENT DOCUMENTS

| | | | |
|---|---|---|---|
| 957,750 | 5/1910 | Cunningham | 43/3 |
| 1,066,587 | 7/1913 | Cunningham | 43/3 |
| 2,011,480 | 8/1935 | Gazalski | 43/3 |
| 2,245,267 | 6/1941 | Elfstrand | 43/3 |
| 2,441,753 | 5/1948 | Carpenter | 43/3 |
| 2,662,327 | 12/1953 | Peterson | 43/3 |
| 2,711,608 | 6/1955 | Fulster | 43/3 |
| 2,787,074 | 4/1957 | Miller | 43/3 |
| 2,857,623 | 10/1958 | Clark | 43/3 |
| 2,885,813 | 5/1959 | Kratzert | 43/3 |
| 3,800,457 | 4/1974 | Barrett | 43/3 |

Primary Examiner—Kurt Rowan
Attorney, Agent, or Firm—Barlow & Barlow, Ltd.

[57] ABSTRACT

A waterfowl decoy has a body portion with a fin on the tail feather portion. A socket is mounted substantially at the center of gravity and a mounting stake is provided, the stake having a pointed end that is received in the socket to permit ease of turning and motion of the decoy to simulate a waterfowl.

4 Claims, 1 Drawing Sheet

U.S. Patent Jan. 16, 1990 4,893,428
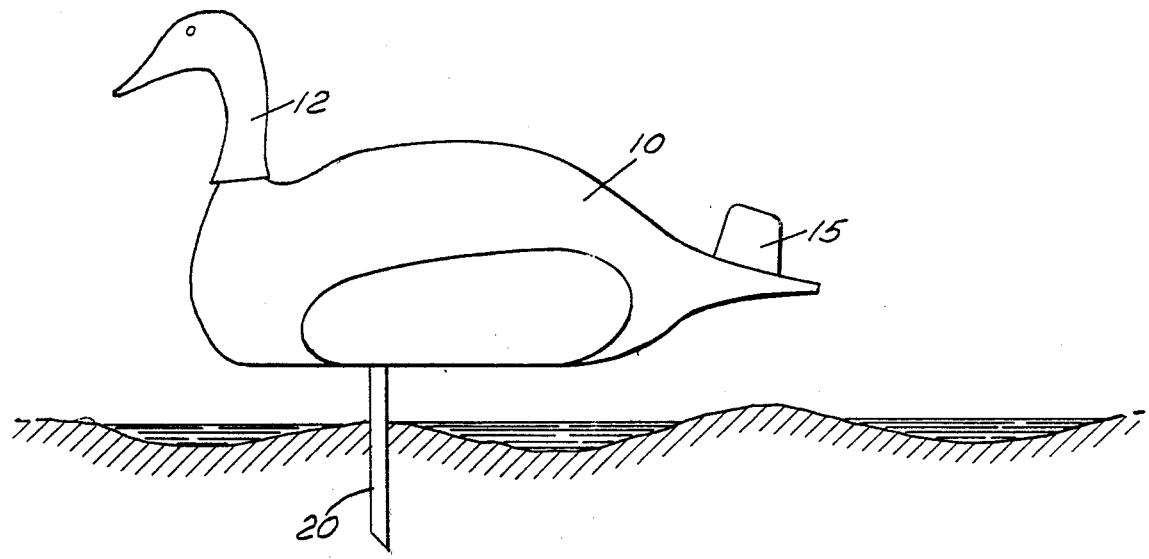
FIG. 1
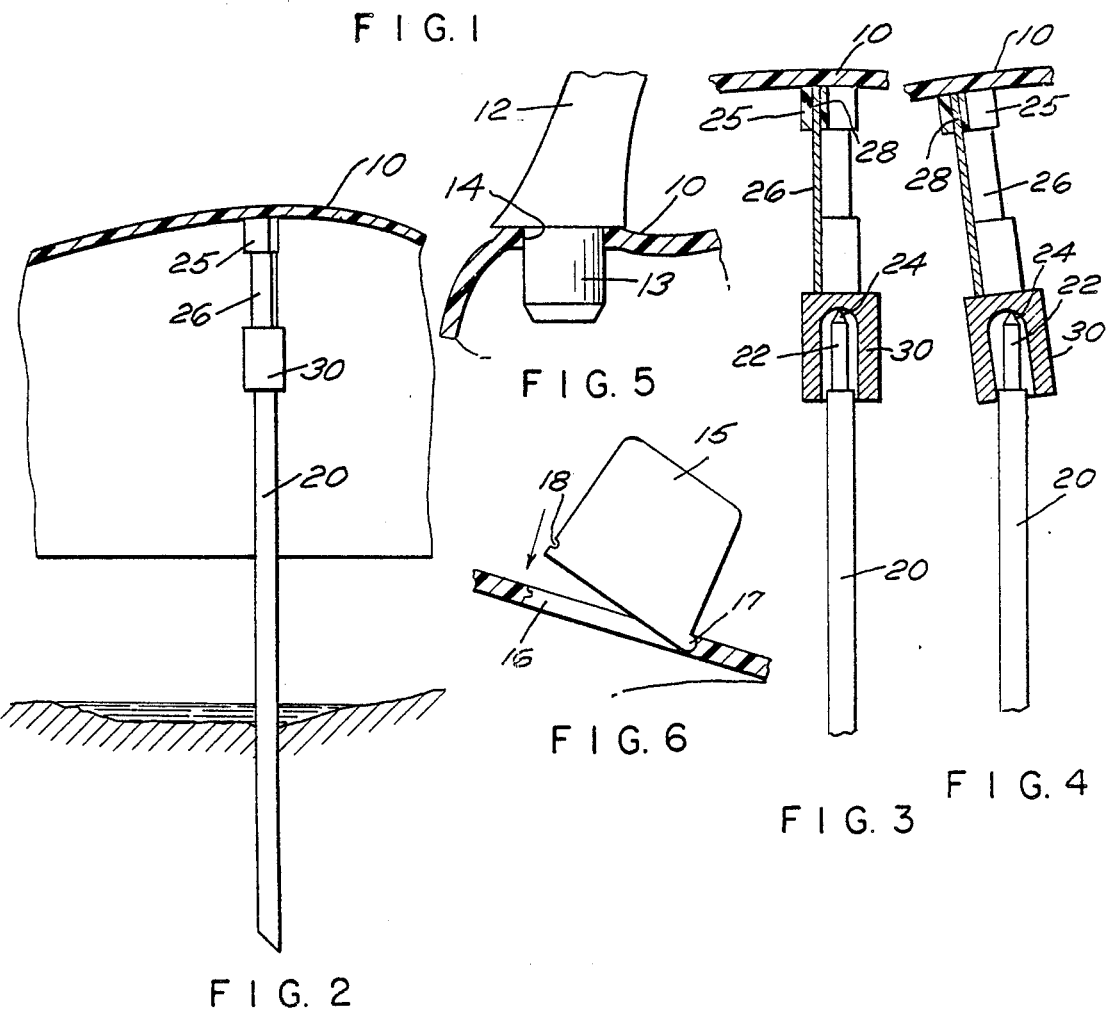
FIG. 2
FIG. 5
FIG. 6
FIG. 3
FIG. 4

SELF-ALIGNING DECOY

BACKGROUND OF THE INVENTION

The utilization of decoys to attract ducks and geese is well known. There are decoys that can be anchored to the bottom and there are other decoys which are made to rest upon stakes. A conventional form of a decoy that may be staked is seen in the Leston patent, U.S. Pat No. 2,736,120. It so happens that during the course of a hunting expedition, the wind may change and it is essential that the decoy face into the wind as would a live bird. One of the attempts at solving this problem is seen in the Miller patent, U.S. Pat. No. 2,787,074, where there is disclosed a series of pulling cords which will manipulate the decoy. This is a significant improvement for attracting water foul and the only difficulty is that the cord coming from the decoy often times gets snarled in weeds and the like and the effectiveness is thereby lost.

SUMMARY OF THE INVENTION

A partly hollowed decoy is provided which has an upper body simulating the body of a duck or a goose and in the tail area, a vertical fin is provided which has sufficient surface so that a change in wind direction will alter the direction that the decoy faces. Near the forward part of the body section, a socket member is provided which socket member is essentially formed with a spherical bottom wall. A stake, which has a reduced end with a point thereon, may be received in the socket to a depth whereby the normal diameter of the stake is received just partially in the socket. This arrangement allows the decoy to readily rock as it is moved by normal wind and also readily pivot.

It is therefore a principal object of this invention to provide a decoy that allows the decoy to pivot and to rock in various directions with ease and naturalness so as to stimulate the motion of a bird.

DESCRIPTION OF THE DRAWINGS

FIG. 1 is a side elevational view showing the decoy of the present invention;

FIG. 2 is a partial elevation view, partly in section, showing the support post;

FIG. 3 is an enlarged view of the pivot joint;

FIG. 4 is an enlarged view partly in section, showing the pivot joint and the manner that rocking is achieved.

FIG. 5 is a detailed cross sectional view of the socket for the head together with a portion of the head; and FIG. 6 is a detailed view of the tail fin.

DESCRIPTION OF THE PREFERRED EMBODIMENT

The decoy comprises a body portion 10 which may, as illustrated, has a removable head 12. The head has a spigot 13 which as seen in FIG. 5 is fitted into aperture 14. Attached to the tail portion of the body is a fin 15. Ideally, the fin is constructed as a separate piece and is arranged to be fitted into a slot 16 in the tailfeather section of the decoy in a tight configuration and in a fashion so that the same will stand upright and act as a rudder to maintain the decoy in a position where its head is always pointing into the wind. As seen in FIG. 6, the fin may have a protrusion 17 and a recess 18 which effects interlocking in slot 16. The shape of the fin may be varied depending upon the mass of the decoy body and will generally resemble the rudder on an airplane.

Referring to FIG. 2, the pivot structure is illustrated. Here it will be noted that the stake is made up of a cylindrical post 20 which has a reduced end at 22 that rises into a pointed portion at 24. Fitted into a boss 25 that is conveniently located in the underbody of the decoy at the center of gravity thereof, is a right angular post 26 which is preferably removably received into a slot 28 in boss 25. This right angular post 26 has secured thereto a socket 30 which is provided in the bottom wall thereof with a spherical end. The socket is therefore releasably held to the body by the removable post 26. As seen in the drawings, the pointed end of the post may rock on the spherical end portion of the socket which is permitted by virtue of the reduced end portion of the post and the fact that only a small portion of the post's normal diameter is received in the socket 30.

In use, decoys are set out in marsh land, each stake being placed into the ground and the decoy, with a suitable head, is placed onto the stake. As any crosswinds or other winds hit the decoy, the fin will cause the decoy to wabble and move slightly and if sufficient force is exerted, the decoy will move to point with its head portion to the prevailing wind. Any slight motion of the wind will tend to wabble the decoy creating an illusion from the air that the decoy is alive. The motion is enhanced by the fact that the end 22 is free to move in the socket 30, being only restricted at the mouth of the socket.

I claim:

1. A self-aligning decoy comprising a body in the shape of a bird including a head portion and a body portion; said body portion having a tail portion, a fin mounted on the tail portion substantially along the central portion thereof, said fin extending generally perpendicular to the body, a socket having a spherical end mounted near the center of gravity of the body, said socket opening downwardly towards the bottom portion of the decoy, a stake having a generally cylindrical cross-section with a reduced end portion, said reduced end portion having a pointed end and being received in said socket.

2. A decoy as in claim 1 wherein a slot is provided on the tail portion and said fin may be releasably secured in said slot.

3. A decoy as in claim 1 wherein the socket is releasably secured to the body.

4. A decoy as in claim 1 wherein the maximum diameter of the stake is received only at the rim of the socket.

* * * * *